INVENTORS:
ROBERT V. SYMNOSKI
AND C.B. MOORE
BY
ATTORNEY

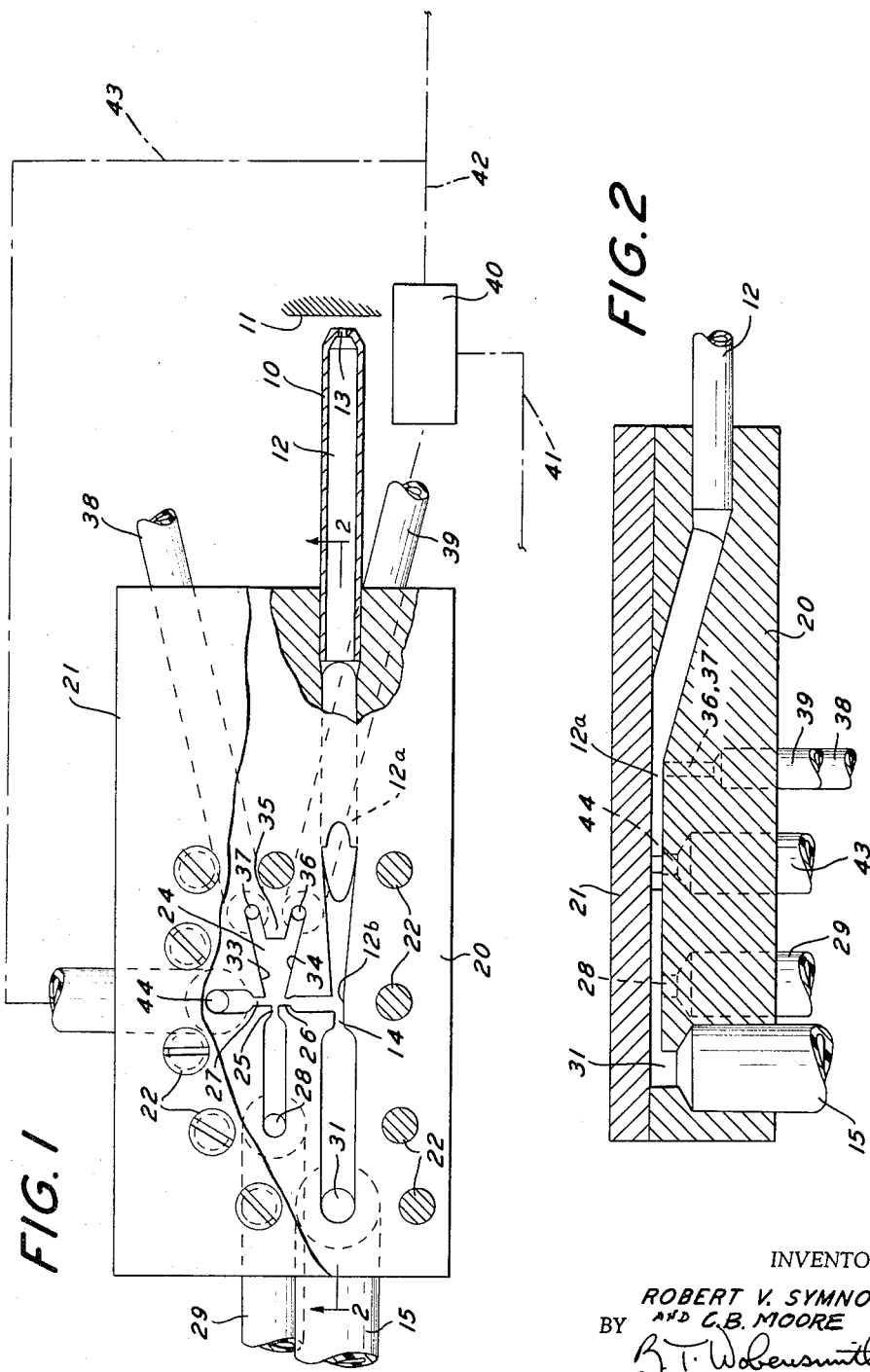

United States Patent Office 3,232,095
Patented Feb. 1, 1966

3,232,095
PNEUMATIC MEASURING APPARATUS

Robert V. Symnoski, Philadelphia, and Coleman B. Moore, Uwchland, Pa., assignors to Moore Products Co., Philadelphia, Pa., a corporation of Pennsylvania
Filed Mar. 23, 1962, Ser. No. 182,019
2 Claims. (Cl. 73—37.5)

This invention relates to pneumatic measuring apparatus and more particularly to such apparatus which is suitable for controlling operations based upon response to a dimension, such as automatic sizing or selection of articles.

Pneumatic gages have heretofore been proposed, operating upon the principle that if a fluid under constant pressure is forced through upstream and downstream orifices in series with one another, the gaseous pressure in the space between the orifices will be a function of the relative sections of the orifices and the measurement of the gaseous pressure in the space will indicate the effective area of the discharge or downstream orifice, as varied by the position of the work with respect thereto, within certain limits. One of the factors affecting the speed of response is the volume of the space between the two orifices and even if this is kept small there is still an appreciable time interval required when a compressible medium, such as air, is employed, for the pressure to build up and become stable at an equilibrium value. Various proposals have been made to improve the speed of systems of this type but the speed attained with the present system is not only greater by far than anything heretofore attained but at the same time a very high accuracy of response is available so that exceedingly minute dimensions can be measured.

It has heretofore been proposed to provide a pure fluid amplifier of the type known as a boundary layer control amplifier in which high energy power jets are controlled by pressure distribution in a power jet boundary layer region. The pressure distribution is controlled by the wall configuration of an interaction chamber. The interaction chamber advantageously has one or more control jets or pressure sources for deflecting and controlling the power jet and at least one side wall thereof shaped so that the power jet can be locked onto such side wall and remain in that condition, or be unlocked from such side wall and remain in such unlocked condition.

The pneumatic measuring apparatus of the present invention utilizes a measured pressure determined by a dimension and certain principles of the boundary layer fluid amplifier.

It is the principal object of the present invention to provide improved arrangement for increasing the speed of operation of a pneumatic gage.

It is a further object of the present invention to provide pneumatic measuring apparatus in which the volume of the portion in which the measuring pressure is available is greatly reduced.

It is a further object of the present invention to provide pneumatic measuring apparatus in which a change in the pressure in the measured pressure portion is effective in an improved manner for a triggering action.

It is a further object of the present invention to provide pneumatic measuring apparatus in which a change in pressure in the measured pressure portion is effective in one form of the invention for a fluid to wall locking action and in another form of the invention to a fluid from wall unlocking action for utilization of the change in measured pressure.

It is a further object of the present invention, in increasing the speed of operation of a pneumatic gage, to provide improved apparatus responsive to the gaging pressure in which no moving mechanical parts are required.

It is a further object of the present invention, in increasing the speed of operation of a pneumatic gage, to incorporate with the gage, fluid circuit arrangements for making available the effect of the dimension responsive pressure.

Other objects and advantageous features of the invention will be apparent from the description and claims.

The nature and characteristic features of the invention will be more readily understood from the following description, taken in connection with the accompanying drawings forming part thereof, in which:

FIGURE 1 is a diagrammatic view of one preferred form of gaging apparatus in accordance with the invention;

FIG. 2 is a longitudinal sectional view taken approximately on the line 2—2 of FIG. 1;

Figure 3:
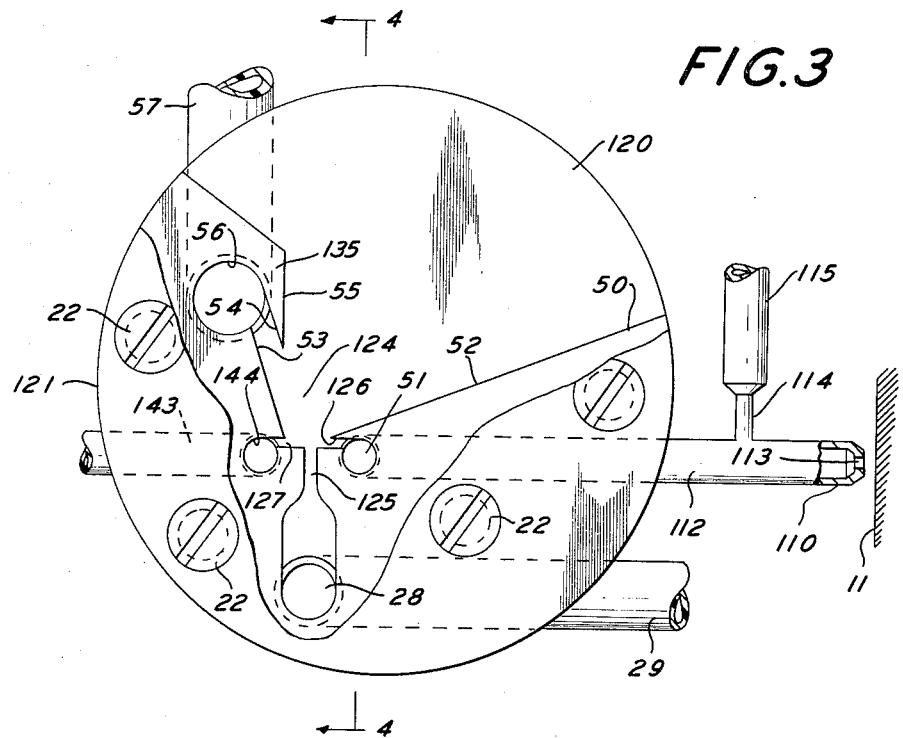
FIG. 3 is a diagrammatic view of another preferred form of gaging apparatus in accordance with the invention.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, a gage plug of a well known type is shown at 10 for gaging the distance from the outer face thereof to a workpiece 11. The gage plug 10, as is well known, can be used for external or internal measurements in a variety of applications.

The gage plug 10, shown merely by way of illustration, has an interior fluid passageway 12 connected thereto and extending to a restricted discharge nozzle 13. The passageway 12 is in communication through an upstream restriction or orifice 14, adjustable or fixed as desired, to a supply pipe 15 to which the output side of an adjustable pressure fluid regulator (not shown) is connected. The pressure fluid regulator, by suitable adjustment, determines the pressure of the fluid supplied to the pipe 15 and through the restriction 14, and with the restriction 14 determines the gaging pressure range. The fluid passageway 12 is part of the measured pressure responsive portion of the apparatus in which the pressure is determined by the dimension to be measured.

The fluid passageway 12 preferably has a part 12a thereto provided in a block or plate 20 with which a cover plate 21 is held in assembled relation in any desired manner, such as by screws 22. The cover plate 21 is shown as made of transparent synthetic plastic material although it is not limited to such material.

The plate 20 preferably has formed therein a chamber 24, with a fluid supply nozzle 25, a control nozzle 26 on one side of the chamber 24 connected to the passageway 12 on the delivery side of the restriction 14, and a control nozzle 27 on the opposite side of the chamber 24. The nozzles 26 and 27 are substantially at right angles to the nozzle 25 and the nozzles 25, 26 and 27 form constricted supply orifices communicating with the chamber 24. The fluid supply nozzle 25 can communicate with a bore 28 in the plate 20 and be connected by a pipe 29 to any suitable source of fluid under pressure, such as air or other gas, or water or other liquid.

The pipe 15 can be connected through a bore 31 in the plate and the portion of the passageway 12 shown at 12b and beyond the restriction 14, can be formed as the recovery section of a Venturi tube to permit, if desired, operating with the pressure at 12b and at nozzle 26 substantially below that at the nozzle 13.

The chamber 24 preferably has diverging walls 33 and 34 and an end divider 35, providing separated fluid paths communicating respectively with bores 36 and 37 in the plate 20. One of the bores 36 and 37 and as illustrated the bore 37 is shown as a waste or discharge connection and has a discharge pipe 38 connected thereto. The other bore, such as the bore 36 can then be connected by a pipe 39 to a relay 40.

The relay 40 can have a supply connection 41 connected thereto from a suitable source of supply of pressure fluid. The relay 40 has a transmitted pressure connection 42 extending therefrom for the delivery of pressure fluid from the supply connection 41 and controlled by the input at the pipe 39. The transmitted pressure may be used for control, power actuation, or other purposes, as desired.

The relay 40 is of the reverse acting type, that is, one which reduces or cuts off its output upon a rise in the control pressure in the pipe 39, but is not limited to this character of action.

The transmitted pressure connection 42 has a branch pipe 43 extending therefrom and to a bore 44 in the block 20 which is connected to the nozzle 27.

The mode of operation of the structure shown in FIGS. 1 and 2 will now be pointed out.

Gaging fluid, such as air under pressure, is supplied through the supply pipe 15 and the bore 31 and through the restriction 14 and the passageway 12 for discharge against the workpiece 11 in the usual manner. The measured pressure effective in the passageway 12, within the gaging range, will be determined by the relative spaced positions of the nozzle 13 and the workpiece 11. For any prescribed state existing in the chamber 24 the pressure conditions at the nozzle 26 will be determined by the pressure conditions in the passageway 12.

Fluid under pressure supplied through the supply pipe 29 and the bore 28 is delivered by the nozzle 25 into the chamber 24. Assume that the jet of fluid from the nozzle 25 has been diverted from a straight path so as to move along the wall 34 to the bore 36 and through the pipe 39 to the relay 40.

The flow of the jet from the nozzle 25 along the wall 34 is effective for causing the space between the jet and the wall 34 to become evacuated so that the boundary layer effect is initiated and continued and the jet is locked onto the wall 34 and flows out through the bore 36. This lock-on action will continue until overcome as hereinafter pointed out.

The action of the fluid delivered through the pipe 39 operates to cut off the output of relay 40.

Assume that the clearance between the nozzle 10 and the workpiece 11 decreases, causing a rise in the pressure in the passageway 12.

If the pressure in the passageway 12 and at the nozzle 26 rises to a predetermined extent, it will have sufficient force to deflect the jet from the nozzle 25, unlock it from the wall 34 and deflect it toward the wall 33, where it will become locked onto the wall 33 by the boundary layer effect.

With the jet no longer moving along the wall 34 the pressure in the pipe 39 will drop substantially and the relay 40 will deliver pressure to the pipe 42. The pressure impulse, or increase, effective in the pipe 42 can be used for control purposes and as illustrated is transferred through the pipe 43 and the bore 44 to the control nozzle 27 for resetting the jet from the nozzle 25 from locked on condition with respect to the wall 33 to a condition in locked on relation to the wall 34 assuming that in the meantime the clearance between the nozzle 10 and the workpiece 11 has increased beyond a predetermined value.

Figure 4:
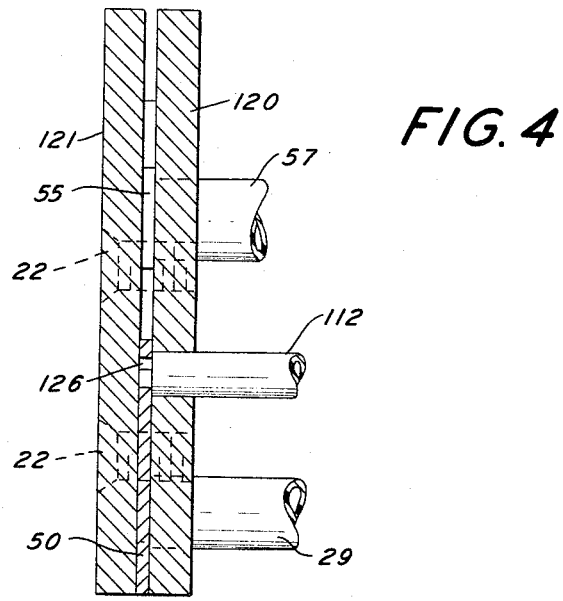
FIG. 4 is a sectional view taken approximately on the line 4—4 of FIG. 3.

Referring now more particularly to FIGS. 3 and 4, the nozzle 113 of the gage plug 110 has the passageway 112 connected thereto. A supply pipe 115 is connected through an upstream restriction 114 to the passageway 112.

A block 120 is provided, with a cover plate 121 held in secured and fluid tight relation by screws 22, and with an interposed control plate 50. The plate 50 has cut out portions to provide the desired shape and has a chamber 124 formed therein with a fluid supply nozzle 125.

The fluid supply nozzle 125 communicates with a bore 28 in the block 120 which bore 28 is connected by a pipe 29 with any suitable source of fluid under pressure. The control nozzle 126 is connected to a bore 51 to which the passageway 112 is connected.

The chamber 124 preferably has a wall 52 provided in the plate 50 and a wall 53. A divider 135 is provided having one wall 54 in spaced relation to the wall 53 and another wall 55 offset to the left beyond the jet from the nozzle 125 so that there cannot be any lock on action between this jet and the wall 55.

The space between the walls 52 and 55 and remote from the nozzle 125 provides for free exhaust and the passageway between the walls 53 and 54 extends to a bore 56 in the plate 50 which is connected by a pipe 57 to the location at which a control fluid delivery is utilized for control, or for providing an impulse, force or fluid flow for control purposes. A nozzle 127 can be provided connected through a port 144 to which a reset pressure applying pipe 143 is connected.

The mode of operation of the structure shown in FIGS. 3 and 4 will now be pointed out.

Gaging fluid, such as air under pressure is supplied through the supply pipe 115 and the restriction 114 to the passageway 112 for discharge through the nozzle 113 of the gage plug 110 and against the workpiece 11 in the usual manner. The measured pressure effective in the passageway 112, within the gaging range, will be determined by the relative spaced positions of the nozzle 113 and the workpiece 11. The pressure conditions at the nozzle 126 will be determined by the pressure conditions in the passageway 112.

Fluid under pressure supplied through the supply pipe 29 and the bore 28 is delivered by the nozzle 125 into the chamber 124.

Assuming that the jet of fluid from the nozzle 125 is not diverted, it will move freely through the chamber 124 to exhaust.

If now the jet from the nozzle 125 is diverted by pressure applied through the nozzle 126, resulting from a sufficient pressure being effective in the passageway 112, the jet will be deflected and will lock onto the wall 53 and remain so locked for delivery through the bore 56 for exercising a control function.

The jet from the nozzle 125 can be reset to its initial discharge condition in any desired manner, such as by interruption of its flow, or by pressure applied through the nozzle 127.

We claim:

1. Pneumatic measuring apparatus comprising a gage member, a source of fluid under pressure, a fluid connection from said source to said gage member having a pressure therein determined by a dimension of the work to be gaged, and means responsive to the pressure in said fluid connection comprising a bistable boundary layer control amplifier having spaced wall portions defining a chamber, another source of fluid pressure, a nozzle connected to said other source for directing a fluid jet into said chamber, said chamber having one of said wall portions bounding with said jet a region in which the pressure decreases when approached by the jet and for influencing the direction of said jet, a control fluid connection from said fluid connection to said chamber for influencing the direction of said jet in one direction and receiving means responsive to the position of said jet, said receiving means including a second control fluid connection therefrom to another of said wall portions for influencing the direction of said jet in the opposite direction.

2. Pneumatic gaging apparatus comprising a gaging member having a fluid discharge portion, a source of fluid under pressure, a fluid connection from said source to said gaging member having a venturi therein with throat and recovery sections, a bistable boundary layer control fluid amplifier, a source of operating fluid connected to said amplifier, said amplifier having a portion providing a fluid jet and a portion providing opposed control ports for said jet, and a connection from the throat of said venturi to one of said control ports, said amplifier having a signal output connection, and means responsive to the pressure in said signal output connection, said means including a fluid connection to the other of said control ports for repositioning said jet.

References Cited by the Examiner

UNITED STATES PATENTS

| | | | |
|---|---|---|---|
| 2,571,557 | 10/1951 | Fortier | 73—37.5 |
| 3,122,165 | 2/1964 | Horton | 133—608 |

FOREIGN PATENTS

| | | |
|---|---|---|
| 442,365 | 2/1936 | Great Britain. |
| 757,216 | 9/1956 | Great Britain. |

OTHER REFERENCES

Article from "Electromechanical Design," June 1960, pages 60 and 61.

Article from "Popular Science Monthly," July 1960, pages 23 and 24.

LOUIS R. PRINCE, *Primary Examiner.*

ISAAC LISANN, *Examiner.*